July 2, 1963  E. VOSS ETAL  3,096,215
SEALED STORAGE BATTERY
Filed April 11, 1960  2 Sheets-Sheet 1

INVENTORS
Ernst Voss
Klaus Dehmelt
BY
Michael S. Striker
Attorney

United States Patent Office 3,096,215
Patented July 2, 1963

3,096,215
SEALED STORAGE BATTERY
Ernst Voss and Klaus Dehmelt, Frankfurt am Main, Germany, assignors to Varta Aktiengesellschaft, Hagen, Westphalia, Germany
Filed Apr. 11, 1960, Ser. No. 21,229
Claims priority, application Germany Apr. 9, 1959
10 Claims. (Cl. 136—6)

The present invention relates to a sealed storage battery, and more particularly, to a sealed storage battery including a free-flowing liquid electrolyte and auxiliary electrode means for eliminating gases formed during operation of the battery.

Hermetically sealed storage batteries are known in which the electrolyte is substantially fixed in the pores of the electrodes and separator. However, the quantity of electrolyte which can be incorporated in such a battery is limited by the quantity which can be absorbed by the porous electrodes and separators. This quantity frequently is relatively small and this is disadvantageous with respect to the capacity of the cell or battery. Primarily upon discharge of the battery with high current density, the necessarily relatively high inner resistance of such battery with fixed electrolyte will cause a considerable loss of useful output. Furthermore, batteries with fixed electrolyte could up to now only be built with relatively small capacity. The above disadvantages are particularly marked in batteries with acidic electrolyte wherein, for instance in the case of a lead acid battery, the electrolyte is directly involved in the electro-chemical reactions occurring during charging and discharging of the battery.

It is therefore an object of the present invention to provide a hermetically sealed storage battery which will not be subject to the above-discussed disadvantages.

It is a further object of the present invention to provide a hermetically sealed storage battery including a relatively large quantity of free flowing electrolyte, in which gases can be safely eliminated so that the build-up of excessive overpressure will be prevented.

It is a further object of the present invention to provide a hermetically sealed storage battery of large capacity and including a specific auxiliary gas-consuming electrode which will consume gases evolved during operation of the battery with sufficient speed to prevent build-up of excessive overpressure.

Other objects and advantages of the present invention will become apparent from a further reading of the description and of the appended claims.

With the above and other objects in view, the present invention contemplates in a storage battery, in combination, a casing, means for hermetically sealing the casing, a free flowing liquid electrolyte in the casing filling the same but partly so as to define a gas space within the casing, positive and negative electrodes in the casing in contact with the free flowing liquid electrolyte, and an auxiliary gas-consuming electrode located in the casing, the auxiliary electrode having an exterior surface extending at least partly into the liquid electrolyte and being formed with a cavity opening into the gas space so that the interior surface of the auxiliary electrode formed by the cavity communicates with the gas space.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
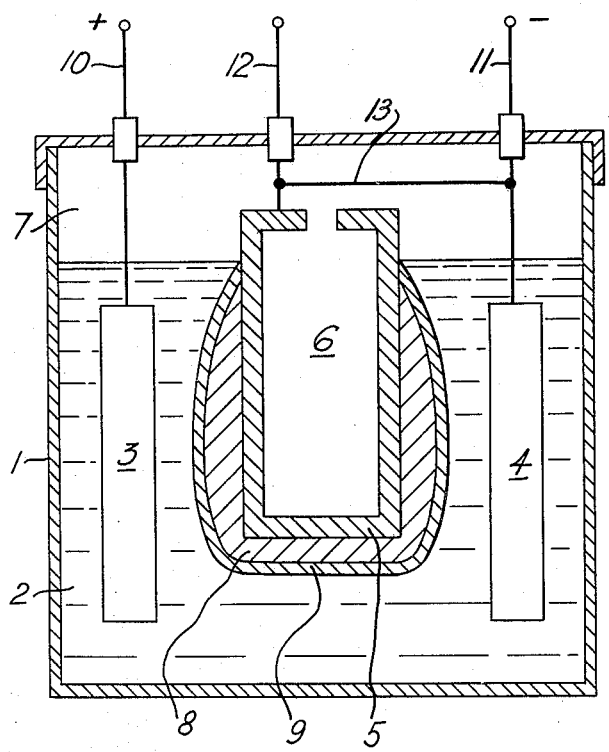
FIG. 1 is a schematic elevational view in cross-section of an embodiment of a battery according to the present invention.

According to the present invention, a permanently hermetically sealed storage battery with free flowing liquid electrolyte will include, in addition to the regular active mass-containing positive and negative electrodes, one or more auxiliary gas-consuming electrodes which consist of electrically conductive material which is inert relatively to the electrolyte. The auxiliary electrode or electrodes are partially immersed in the liquid electrolyte and extend with their uppermost portion into the gas space above the liquid electrolyte. According to the present invention, the auxiliary electrode consists of a porous material, thus increasing the surface area available for gas consumption, and is formed with a cavity communicating with the gas space through an opening in the upper portion of the electrode, while the greatest part of the outer surface of the auxiliary electrode is in contact with the electrolyte.

Thus, the battery according to the present invention operates with a free flowing liquid electrolyte so that all of the favorable conditions generally associated with open and not hermetically closed cell will prevail. The cavity in the auxiliary gas-consuming electrode may be of any desired shape, however, it is essential that the interior of the cavity communicates with the gas space and will be filled with gas. Consequently, the opening in the auxiliary electrode which leads to the cavity must be located in a portion of the auxiliary electrode which is located above the upper level of the free flowing liquid electrolyte so that liquid electrolyte will not enter into the cavity. In this manner, it is accomplished that the surface area of the auxiliary electrode which is available for gas consumption will be much larger than previously thought possible, while simultaneously any reduction in the size of the surface area of the auxiliary electrode which is in contact with the liquid electrolyte is avoided. In other words, the structure according to the present invention permits in an extremely simple and economical manner to increase the contact areas of the auxiliary electrode which on the one hand contact the gas space and on the other hand contact the liquid electrolyte. This is accomplished in such a manner that the overall size of the battery need not be markedly increased.

The auxiliary gas-consuming electrode according to the present invention which possesses a gas-consuming surface area much larger than up to now available, is extremely well suited to prevent pressure increase due to the development of gases during deep discharge or supercharging of the battery. Depending on the type of gas which is evolved, i.e. whether primarily oxygen or hydrogen gas is formed, the auxiliary electrode will be electrically connected either with the negative or with the positive electrode. It has been found that during charging and supercharging of the battery formation of oxygen at the positive electrode is nearly unavoidable, so that in consequence thereof the gas-consuming auxiliary electrode is generally electrically connected with the negative electrode of the battery, in order to be capable of consuming oxygen gas.

According to a preferred embodiment of the present invention, the conductor leading from the auxiliary electrode passes through the wall of the hermetically closed battery housing, insulated therefrom. Outside of the housing, the conductor leading from the auxiliary electrode can then be conductively connected either with the positive or with the negative electrode. According to this arrangement, it is possible to adjust the battery to the charge and discharge conditions by selectively electrically connecting the auxiliary electrode with either the negative or the positive electrode, depending on the type of gas and the charging or discharging condition of the battery. Furthermore, it is possible to connect a current-measuring instrument to the conductor leading outwardly from the auxiliary electrode and to ascertain immediately by reading such instrument whether an equilibrium between gas formation and gas consumption is established.

It is also within the scope of the present invention to insert a resistor, and preferably a variable resistor, between the auxiliary gas-consuming electrode and the negative electrode of the battery in order to make the auxiliary electrode relatively more positive and thus to prevent with certainty that the potential of the auxiliary electrode would be such as to permit hydrogen gas development thereon. By means of an auxiliary voltage, it is possible to adjust the potential of the gas-consuming auxiliary electrode relative to the electrolyte in such a manner that at all times optimum conditions for gas consumption are assured. For this reason, according to another embodiment of the present invention, it is intended to connect the gas-consuming electrode with the positive or negative electrode by way of either a variable resistor or a variable auxiliary voltage, so that during supercharging as well as during deep discharge with reversal of polarity, the potential of the gas-consuming electrode can be adjusted to the value required for reacting the evolving gas at the auxiliary electrode.

In order to prevent liquid electrolyte from entering into the cavity of the gas-consuming electrode, several measures can be taken.

The porous material of the auxiliary electrode can be impregnated with a hydrophobic agent, or the material of the auxiliary electrode may be so finely porous that electrolyte will not be capable of penetrating through the entire thickness of the cavity forming auxiliary electrode wall. It is also possible to cover the outer surface of the portion of the auxiliary electrode which is immersed in the electrolyte with a semi-permeable membrane which allows passage of ions therethrough but will prevent entry of the electrolyte into the auxiliary electrode wall.

Preferably, the auxiliary electrode is made of sintered materials which are to be such that no chemical reaction will take place between the electrode material and the liquid electrolyte. Such materials may be metals or non-metallic materials such as carbon or silicon carbide, or synthetic materials which have been treated so as to become current conducting, as well as metal oxides or sulphides. It is essential that the material of the auxiliary electrode will resist chemical attack by the electrolyte, will be current conducting and preferably will be of porous structure so that the contact area between the auxiliary electrode and the gas to be consumed in contact with the same, is increased.

According to another preferred embodiment of the present invention, the outer wall of the gas-consuming auxiliary electrode is covered in the area which will be below the surface level of the liquid electrolyte, with a layer of thickened electrolyte solution. Such layer of thickened electrolyte solution may consist of the liquid electrolyte of the battery which has been thickened to more or less paste-like consistency by treatment with conventional swelling agents, which do not markedly influence or decrease the migration velocity of the ions. It has been found to be particularly advantageous to cover the submerged outer surface portion of the auxiliary electrode with such layer of thickened electrolyte and then to cover the free surface of the layer of thickened electrolyte with an inert and porous fabric or the like, in order to increase the stability of the thickened electrolyte layer. Of course, any such covering or application of a layer to the outer surface of the auxiliary electrode is to cover only such portion of the outer surface as will be below the surface level of the liquid electrolyte, so that any surface portions located above the surface level of the liquid electrolyte will be available for gas consumption.

Referring now to the drawing and particularly to FIG. 1, a hermetically sealed battery is shown comprising a hermetically sealed casing 1 partially filled with liquid electrolyte 2, positive electrode 3 and negative electrode 4, these electrodes containing active mass, and auxiliary gas-consuming electrode 5. It can readily be seen that auxiliary electrode 5 is formed with a cavity 6 which communicates with gas space 7. The portion of the outer surface of auxiliary electrode 5 which is below the upper level of liquid electrolyte 2, is surrounded by a layer 8 of thickened electrolyte. The outer surface of thickened electrolyte 8 is surrounded and thus held in place by a covering 9 which may consist of an electrolyte-assistant synthetic fabric or of a suitable semi-permeable membrane. Conductors 10, 11 and 12 lead outwardly from the positive, negative and auxiliary electrode, respectively. These conductors pass through the sealed casing electrically insulated from the same and through a gas-tight packing so that the hermetical seal of the battery is not broken by the conductors extending outwardly of the same.

When it is desired permanently to connect the auxiliary electrode 5 to, for instance, negative electrode 4, a conductor 13 may be provided in the interior of the battery housing.

Figure 2:
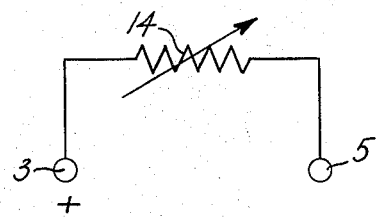
FIGS. 2–4 are schematic illustrations of various switching arrangements for electrically connecting the auxiliary electrode of the present invention with the positive or negative electrode of the battery.
Figure 3:
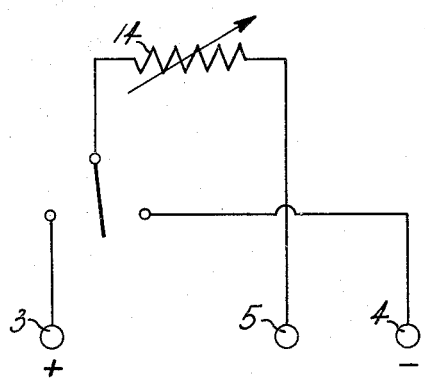
Figure 4:
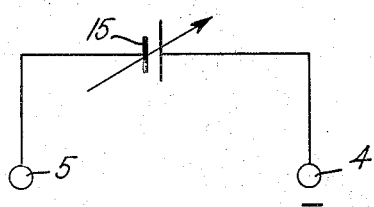

FIGS. 2–4 illustrate some of the switching arrangements which may be used for selectively connecting the auxiliary electrode with either the positive or the negative electrode of the battery. These switching arrangements will be located outside of the hermetically sealed battery housing.

According to FIG. 2, auxiliary electrode 5 is connected with positive electrode 3 over a variable resistor 14.

According to FIG. 3, variable resistor 14 which is connected with auxiliary electrode 5 may be selectively connected with either the positive electrode 3 or the negative electrode 4.

FIG. 4 shows an arrangement wherein the auxiliary electrode 5 is connected with the negative electrode 4 by way of an auxiliary voltage 15.

Figure 5:
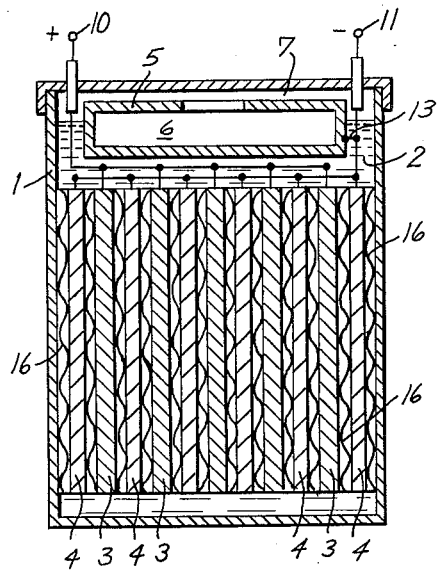
FIGURES 5 and 6 illustrate schematic elevational views in cross section of additional embodiments of the battery according to the present invention.
Figure 6:
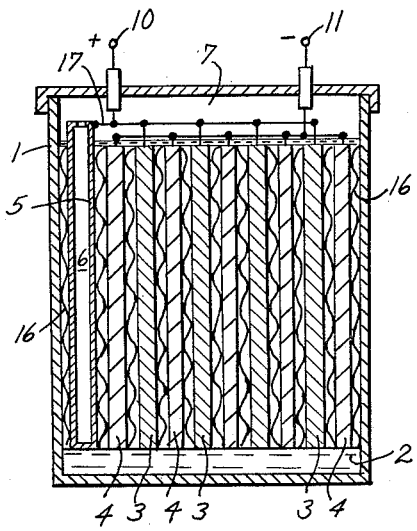

FIG. 5 and FIG. 6 show a cross section of two other arrangements where the auxiliary gas-consuming electrode 5 is inserted at other places of the casing.

FIG. 5 shows an arrangement where the auxiliary gas-consuming electrode 5 is placed above that plate group which is composed of positive electrodes 3, negative electrodes 4 and inserted separators 16. The auxiliary gas-consuming electrode 5 is immersed for more than the half of its length into the liquid electrolyte 2.

The cavity 6 of the auxiliary gas-consuming electrode 5 communicates with gas space 7. The auxiliary gas-consuming electrode 5 is connected with the negative plates 4 by means of a conductor 13. The conductors 10 and 11 are passing through gas-tight packing and protruding from the casing.

FIG. 6 shows an arrangement where the auxiliary gas-consuming electrode 5 is placed aside the plate group and immerses for most of its length into the electrolyte 2. In this case, it communicates electrically with the positive plates 3.

The thickness of the auxiliary gas-consuming electrode can be 1 to 5 mm., a thickness of 2 to 3 mm. is preferable.

The separators 16 can be porous or perforated, they are frequently corrugated or ribbed; the electrodes 3 and 4 are spaced apart by them in a distance of 0.7 up to 2 mm. When utilizing an acid electrolyte 2, as for instance sulphuric acid, separators 16 should be used which are made of material resistant to and electrically inert to this medium, as for instance glass wool, hard rubber or plastic material deriving from the polyvinyl, polystyrene and polyolefin groups.

When utilizing an alkaline electrolyte, as for instance potassium hydroxide, separators analogously made of alkaline-resistant material should be used, such as polyamides, polyvinyl-alcohols and copolymers of such materials.

Positive and negative electrodes 3 and 4 and separators 16 can be employed according to the directives and instructions as mentioned, for instance, in the book by G. M. Vinal, "Storage Batteries," 4th edition 1955, John Wiley and Sons, New York, pages 27 to 60.

When acid electrolyte is applied, the thickness of the plate is 1 to 5 mm., preferably 1 to 2 mm.; also tubular plates may be employed.

When utilizing alkaline electrolyte, the arrangement is the same as described above, with the exception of the application of other material for the active mass and for the separators 16; also sintered electrodes may be employed.

It is essential according to the present invention to provide a gas-consuming electrode as illustrated in FIG. 1, in other words an electrode which is formed with a cavity having a relatively large surface area and communicating with the gas space, so that the gas-consuming surface of the auxiliary electrode is greatly increased without thereby having to decrease the surface area of the auxiliary electrode which will be in contact with the electrolyte. Since it is desired to produce a porous gas-consuming electrode, the auxiliary electrode may be either a press electrode produced by compressing a pulverulent material, or a sinter electrode which preferably is produced by first compressing a pulverulent material and thereafter sintering the same.

In any event, the auxiliary electrode must possess the following qualities:

(1) The material of the auxiliary electrode must be electrically conductive.

(2) The material must be resistant against chemical attack by the electrolyte which is to be used in the respective hermetically sealed battery.

(3) The material and thus the electrode must combine sufficient porosity with sufficient mechanical strength so that at the respective surface portions of the electrode which will be in contact with gas and which will be in contact with electrolyte, gas consumption and the formation of water will take place with the desired speed.

For this purpose, two characteristics of the structure are of major importance, namely the formation of a cavity as illustrated and described above which cavity will communicate with the gas space above the liquid electrolyte and will be filled with gas and, consequently, that at least a minor portion of the electrode structure (namely the portion in which the opening leading to the cavity is located) extends upwardly of the liquid electrolyte.

In view of the fact that the material of the auxiliary electrode must be current conducting, it is necessary in cases to treat otherwise suitable material in conventional manner so as to make the same current conducting. This is not necessary in the case of graphite and other electrically conducting modifications of carbon, or in the case of a sintered metal, or silicon carbide. However, it is necessary to make the material current conductive, when the auxiliary electrode is to be produced of synthetic materials such as polyvinylchloride or polyvinylstyrene, or of metal oxides such as tin dioxide, titanium dioxide chromium (III) oxide, iron (III) oxide or aluminum oxide, or of metal sulfides such as lead sulfide.

Non-conductive porous materials can be made conductive, for instance by vapor deposition of metals. Noble metals of the platinum group may be applied for auxiliary gas-consuming electrodes which consist of a material which per se would not be conductive, regardless whether the auxiliary electrodes will have to operate in connection with an acidic or alkaline electrolyte. Silver and nickel depositions are suitable for auxiliary electrodes which will have to operate with an alkaline electrolyte. Preferably, the metal is mixed with the pulverulent electrode material prior to the sintering or pressing of the same, or, the conductive metal can be precipitated from impregnating solutions onto the electrode surface after the electrode has been formed. In the case of metal oxides as electrode material, it is possible to achieve sufficient conductivity by the addition of graphite or other carbon modifications. This last mentioned method is particularly suitable in connection with titanium dioxide and aluminum oxide while when carbon is added to oxides of tin, chromium or iron, reduction of the metal oxide would take place.

The following examples of methods of producing auxiliary electrodes such as are incorporated in hermetically sealed batteries in accordance with the present invention, are given as illustratives only, the invention however not being limited to any of the specific details of the examples.

*Example 1*

Finely pulverulent titanium dioxide is introduced into a mold cavity which corresponds to the configuration of the electrode. The pulverulent titanium dioxide is then compressed and sintered for between about 7 and 12 minutes, depending on the thickness of the electrode wall, at a temperature of between 1,660 and 1,710 degrees C. After cooling, the sintered titanium dioxide electrode is then introduced into a 10%, ammonia-containing silver nitrate solution, whereby a partial vacuum may be employed in order to speed up penetration of the pores of the electrode by the silver nitrate solution. The thus-treated electrode is then dried and thereafter introduced into a bath which contains a sufficient concentration of formaldehyde for precipitating silver from the silver salt adhering to the inner surfaces of the electrodes. If desired, the impregnation and precipitation of silver may be repeated.

*Example 2*

Silicon carbide possesses sufficient electric conductivity for use as the material for the auxiliary electrode. Finely pulverulent silicon carbide is sintered at temperatures which may be as high as 1,800° C. whereby the sintering time will be about 10 minutes, or as low as 1,550° C. whereby then the sintering time will be about 30 minutes.

Due to the fact that the auxiliary electrode must possess a certain degree of mechanical strength, it is generally not advisable to prepare the auxiliary electrode by pressing without sintering. However, there are certain exceptions to this rule, it is for instance possible to produce press electrodes from pulverulent synthetic materials which have been treated so as to become electrically conductive. However, in most cases, the auxiliary electrodes will be produced by sintering.

The particle size of the pulverulent materials which are to be sintered (or compressed) to form the auxiliary electrode, will preferably be within 1 and 100 microns.

If a pulverulent material of substantially even particle size, for instance a particle size of between 10 and 25 microns is used, electrodes are obtained which possess pores of relatively even size, and which also possess a rather high total pore volume. In many cases, however, it is advisable to reduce the total pore volume without losing the average even size of the pore. For this purpose, it is advisable to mix two pulverulent materials of different sizes each of which per se should be of even or as even as possible particle size. For instance, a first pulverulent material having a particle size of between 10 and 25 microns may be mixed with a pulverulent material having a particle size of between 5 and 10 microns. The pore volume which in the first described case, namely by using only one pulverulent material having a particle size of between 10 and 25 microns, will be between about 50 and 70% of the total volume of the electrode, can be reduced by mixing two materials of different particle sizes as described above, to a total pore volume of between about 25 and 45% of the total volume of the auxiliary electrode. Thereby, the further advantage is achieved that, although the total pore volume is reduced, the active surface of the electrode including the inner surface thereof will be increased. By using equal quantities of identical material, such as 50% by weight of the relatively larger particle size and 50% by weight of the relatively smaller particle size, the total pore volume will be between about 30 and 40%.

While it is possible to sinter all of the starting materials mentioned above under atmospheric conditions, it is advisable when producing auxiliary electrodes from carbon or nickel, to operate in a reducing atmosphere. Nickel electrodes have been found particularly suitable in connection with alkaline electrolytes. At the temperature of 1,000°, sufficiently firm sintering is achieved within a period of between 2 and 4 minutes. However, it is also possible to sinter nickel powder at a temperature of only about 600° C. whereby, however, the sintering time has to be increased to between 50 and 75 minutes. Aluminum oxide sinter electrodes can be produced by sintering at 800° C. for 30 minutes. Carbon electrodes can be produced in two ways. Either electrically conductive carbon is severely compressed and the thus-produced electrode is heated to glowing temperature in order to adhere the individual particles of carbon to each other whereby a sufficiently strong electrode with relatively small total pore volume and an average active surface is obtained, or the electrically conductive carbon is first mixed with organic materials such as starch or sugar and the electrode is then pressed of such mixture with subsequent heating to glowing temperature. Thereby, carbon electrodes with a relatively larger pore volume are obtained, due to the decomposition of the organic material and the surface area which is available for gas consumption will be greater in electrodes of the last-described type which were produced from a mixture of electrically conductive carbon and such organic material. Somewhat similar electrodes can also be produced from a mixture of electrically conductive carbon and finely pulverulent nickel powder. Instead of nickel, it is also possible to admix silver, cadmium or zinc powder to the carbon powder. However, electrodes containing the last-mentioned three metals should be used only in connection with alkaline electrolyte. Good results are obtained with mixed carbon-metal electrodes containing 25% by weight of carbon and 75% by weight of metal.

The following example relates to a gas-consuming electrode made of polyvinylchloride powder.

*Example 3*

Synthetic material—sinter electrodes may be produced of polyvinylchloride powder having a particle size of between 4 and 100 microns. Particularly good results are obtained with particle sizes between about 6 and 15 microns. Prior to sintering, carbon powder may be admixed provided that sintering is then carried out in a reducing atmosphere, or it is also possible to admix finely divided metals such as silver. After forming an intimate mixture of the polyvinylchloride powder and the added electrically conductive material, auxiliary electrode bodies are formed and pressed of these mixtures at a temperature of between 230 and 300° C., depending on the thickness of the electrode wall. Sintering is carried out for a period of between about 20 and 40 seconds.

In order to prevent penetration of the auxiliary electrode by free flowing liquid electrolyte, it is sometimes desirable to impregnate the auxiliary electrode with hydrophobic agents. The purpose of such impregnation is of course to prevent passage of electrolyte through the wall of the electrode into the cavity in the interior of the electrode which cavity communicates with the gas space above the surface level of the liquid electrolyte, without completely preventing slight penetration of the electrolyte into the outer portion of the submerged electrode wall. For this purpose, it has been found to be particularly suitable to use fatty acid aluminum salts such as aluminum stearate, or silicon oil emulsions. It is important to watch that not too much of the hydrophobic agent will be retained in the porous electrode. For instance, if paraffin is used as the hydrophobic agent, the same is preferably applied to the electrode in vapor form. However, it is also possible to admix the hydrophobic agents to the pulverulent mass prior to forming and sintering of the same. During the sintering, the major portion of the hydrophobic agents will volatilize, however, a sufficient quantity will be retained in order to prevent electrolyte from passing through the electrode wall into the cavity in the interior of the auxiliary electrode.

It is sometimes desired to surround the outer surface portion of the auxiliary electrode which is immersed in the liquid electrolyte, with a layer of thickened electrolyte. For the purpose of thickening the electrolyte any suitable conventional gelatinizing agent can be used. Particularly good results have been obtained with a colloidal silicon-dioxide which is known under the trade name "Aerosil" and which consists of very fine silicic acid dust having a particle size of between 15 and 35 millimicrons. This silicon dioxide can be used for alkaline as well as for acidic electrolytes. The thickness of the layer of thickened electrolyte preferably will be between about 0.5 and 2 millimeters. In the case of alkaline electrolytes, good results are also obtained with a thickened electrolyte layer consisting of precipitated nickel hydroxide, in such cases where the auxiliary electrode is connected to the cathode. In order to maintain the layer of thickened electrolyte in place, in contact with the submerged outer surface portion of the auxiliary electrode, a covering of electrolyte resistant synthetic fabric such as Perlon or polyvinylchloride may be used. It is also possible, instead of the above-mentioned covering, to place the thickened electrolyte layer-covered portion of the electrode into a semi-permeable membrane such as isinglass or into a membrane-filter paper having pore sizes of between 5 and 100 millimicrons. These pores are sufficiently large to allow passage therethrough not only of hydrogen ions, but also of hydroxyl ions and of water molecules.

Basically there will be no difference in the structure of the hermetically sealed battery according to the present invention irrespective of whether alkaline or acidic free flowing electrolyte is used.

The following examples describe two batteries according to the present invention.

*Example 4*

In a battery with acidic electrolyte, the positive electrode may consist of a lead grid and conventional lead oxide mass. The capacity may be about 14 ampere hours, the negative electrode will also consist of a grid electrode with lead sponge as active mass and will have a capacity of about 20 ampere hours. The gas-consuming auxiliary electrode in the hermetically sealed battery may be made of silicon carbide in the manner described further above and may have a porosity of 70%. The square area of the surface of the auxiliary electrode which defines the cavity therein will be between 200 and 300 square centimeters, preferably between 240 and 260 square centimeters. By electrically connecting the auxiliary gas-consuming electrode with the cathode of the battery, oxygen gas will be consumed in a quantity corresponding to the quantity evolved by a current of between 1 and 2 amperes. On the other hand, by connecting the auxiliary electrode with the anode, hydrogen gas can be consumed in a quantity corresponding to the quantity evolved by a current of between 0.5 and 1.5 amperes. The inner pressure in the sealed battery will not exceed in either case 1.5 atmospheres above atmospheric pressure. The density of the sulphuric acid electrolyte will be 1.285. A thickened layer of electrolyte is formed around the outer submerged surface of the auxiliary electrode with the help of colloidal silicon dioxide of the type described further above. The hermetically sealed casing preferably will consist of polystyrene.

*Example 5*

In the case of an alkaline electrolyte, the positive electrode will be a sintered plate made of nickel with nickel-oxide as active mass, having a capacity of 1 ampere hour, and the negative electrode will be a sinter electrode with cadmium as active mass having a capacity of 1.5 ampere hours. The auxiliary gas-consuming electrode may be a carbon electrode which has been impregnated with cobalt compounds and will have a porosity of 45%. Thereby the quantity of cobalt will approximate 1% of the total weight of the electrode. The surface portion of the electrode which surrounds the cavity therein will be between 30 and 60 square centimeters, preferably between 45 and 50 square centimeters. Allowing for an inner pressure of at most 1.5 atmospheres above atmospheric pressure, and by connecting the auxiliary electrode with the cathode, oxygen corresponding to 100 milliamperes, and by connecting the auxiliary electrode with the anode, hydrogen corresponding to 60 milliamperes can be consumed. The liquid electrolyte is an aqueous potassium-hydroxide solution having a density of 1.20. The hermetically sealed housing may consist for instance of nickel-plated sheet iron.

In order to save space, and to reduce the inner resistance between the positive and negative electrode, it is also possible to arrange the auxiliary electrode in a position relative to the positive and negative electrodes which differs from what is illustrated in FIG. 1. For instance, the auxiliary electrode can be arranged closer to one side of the housing so as not to be interposed between the positive and negative electrode, or the auxiliary electrode can also be of a flattened configuration and arranged above the positive and negative electrodes.

It will be understood that each of the elements described above, or two or more together, may also find a useful application in other types of batteries differing from the types described above.

While the invention has been illustrated and described as embodied in a hermetically sealed storage battery operating with a free flowing electrolyte, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a storage battery, in combination, a casing; means for hermetically sealing said casing; a free flowing liquid electrolyte in said casing filling the same but partly so as to define a gas space within said casing; positive and negative electrodes in said casing substantially submerged in said free flowing liquid electrolyte; and an auxiliary gas-consuming electrode consisting essentially of an electrically conductive material which is inert with respect to said liquid electrolyte located in said casing spaced from said positive and negative electrodes and electrically connected to one of said electrodes, said auxiliary electrode having a major exterior surface portion in contact with said liquid electrolyte and being formed with a cavity opening into said gas space so that the interior surface of said auxiliary electrode formed by said cavity communicates with said gas space and said cavity will be substantially free of liquid electrolyte.

2. In a storage battery, in combination, a casing; means for hermetically sealing said casing; a free flowing liquid electrolyte in said casing filling the same but partly so as to define a gas space within said casing; positive and negative electrodes in said casing substantially submerged in said free flowing liquid electrolyte; and an auxiliary gas-consuming electrode consisting of an electrically conductive porous material which is inert with respect to said liquid electrolyte located in said casing spaced from said positive and negative electrodes and electrically connected to one of said electrodes, said porous auxiliary electrode having a major exterior surface portion in contact with said liquid electrolyte and being formed with a cavity opening into said gas space so that the interior surface of said auxiliary electrode formed by said cavity communicates with said gas space and the pores of said porous auxiliary electrode being sufficiently fine to prevent access of said free flowing electrolyte to said cavity.

3. A storage battery as defined in claim 2, including electric conduits extending from said positive, negative and auxiliary electrodes, respectively, outwardly through said casing; and conduit means located outwardly of said casing for selectively connecting the conduit extending from said auxiliary electrode with one of said conduits extending from said positive and negative electrodes, respectively.

4. A storage battery as defined in claim 3 wherein said conduit means include auxiliary voltage controlling means for adjusting the potential of said auxiliary electrode to the potential required for consumption of gas concurrently formed with said battery.

5. In a storage battery, in combination, a casing; means for hermetically sealing said casing; a free flowing liquid electrolyte in said casing filling the same but partly so as to define a gas space within said casing; positive and negative electrodes in said casing substantially submerged in said free flowing liquid electrolyte; and an auxiliary gas-consuming electrode located in said casing spaced from said positive and negative electrodes and electrically connected to one of said electrodes, said gas-consuming electrode consisting of an electrically conductive porous material which is inert with respect to said liquid electrolyte and which is impregnated with a hydrophobic agent which is incapable of reacting with said electrolyte, said auxiliary electrode having a major exterior surface portion in contact with said liquid electrolyte and being formed with a cavity opening into said gas space so that the interior surface of said auxiliary electrode formed by said cavity communicates with said gas space and the pores of said porous auxiliary electrode being sufficiently fine to prevent access of said free flowing electrolyte to said cavity.

6. In a storage battery, in combination, a casing; means for hermetically sealing said casing; a free flowing liquid electrolyte in said casing filling the same but partly so as to define a gas space within said casing; positive and negative electrodes in said casing substantially submerged in said free flowing liquid electrolyte; and an auxiliary gas-consuming electrode consisting of a porous sintered metal which is inert with respect to said liquid electrolyte located in said casing spaced from said positive and negative electrodes and electrically connected to one of said electrodes, said auxiliary electrode having a major exterior surface portion in contact with said liquid electrolyte and being formed with a cavity opening into said gas space so that the interior surface of said auxiliary electrode formed by said cavity communicates with said gas space, the pores of said sintered auxiliary electrode being sufficiently fine to prevent said free flowing electrolyte from passing into said cavity.

7. In a storage battery, in combination, a casing; means for hermetically sealing said casing; a free flowing liquid electrolyte in said casing filling the same but partly so as to define a gas space within said casing; positive and negative electrodes in said casing substantially submerged in said free flowing liquid electrolyte; and an auxiliary gas-consuming electrode consisting of a porous material which is inert with respect to said liquid electrolyte and which is selected from the group consisting of carbon and silicon carbide, and of metal oxides, metal sulfides, and synthetic materials which have been treated so as to be capable of conducting electric current located in said casing spaced from said positive and negative electrodes and electrically connected to one of said electrodes, said auxiliary electrode having a major exterior surface portion in contact with said liquid electrolyte and being formed with a cavity opening into said gas space so that the interior surface of said auxiliary electrode formed by said cavity communicates with said gas space and the pores of said porous auxiliary electrode being sufficiently fine to prevent access of said free flowing electrolyte to said cavity.

8. In a storage battery, in combination, a casing; means for hermetically sealing said casing; a free flowing liquid electrolyte in said casing filling the same but partly so as to define a gas space within said casing; positive and negative electrodes in said casing substantially submerged in said free flowing liquid electrolyte; and auxiliary gas-consuming electrode consisting of an electrically conductive material which is inert with respect to said liquid electrolyte located in said casing spaced from said positive and negative electrodes and electrically connected to one of said electrodes, said gas-consuming electrode having a major exterior surface portion in contact with said liquid electrolyte, said auxiliary electrode being formed with a cavity opening into said gas space so that the interior surface of said auxiliary electrode formed by said cavity communicates with said gas space and said cavity will be substantially free of liquid electrolyte; and a semi-permeable membrane surrounding said exterior surface portion of said auxiliary electrode.

9. In a storage battery, in combination, a casing; means for hermetically sealing said casing; a free flowing liquid electrolyte in said casing filling the same but partly so as to define a gas space within said casing; positive and negative electrodes in said casing substantially submerged in said free flowing liquid electrolyte; an auxiliary gas-consuming porous electrode consisting of an electrically conductive material which is inert with respect to said liquid electrolyte located in said casing spaced from said positive and negative electrodes and electrically connected to one of said electrodes, said gas-consuming electrode having a major exterior surface portion in contact with said liquid electrolyte, said auxiliary electrode being formed with a cavity opening into said gas space so that the interior surface of said auxiliary electrode formed by said cavity communicates with said gas space and said cavity will be substantially free of liquid electrolyte; and an electrolyte-impermeable, ion-permeable membrane covering said exterior surface portion of said auxiliary electrode and the pores of said porous auxiliary electrode being sufficiently fine to prevent access of said free flowing electrolyte to said cavity.

10. In a storage battery, in combination, a casing; means for hermetically sealing said casing; a free flowing liquid electrolyte in said casing filling the same but partly so as to define a gas space within said casing; positive and negative electrodes in said casing substantially submerged in said free flowing liquid electrolyte; an auxiliary gas-consuming porous electrode consisting of an electrically conductive material which is inert with respect to said liquid electrolyte located in said casing spaced from said positive and negative electrodes and electrically connected to one of said electrodes, said gas-consuming electrode having a major exterior surface portion in contact with said liquid electrolyte, said auxiliary electrode being formed with a cavity opening into said gas space so that the interior surface of said auxiliary electrode formed by said cavity communicates with said gas space and said cavity will be substantially free of liquid electrolyte; and a layer of thickened electrolyte adhering to and covering said exterior surface portion of said auxiliary electrode and the pores of said porous auxiliary electrode being sufficiently fine to prevent access of said free flowing electrolyte to said cavity.

References Cited in the file of this patent
UNITED STATES PATENTS

| | | |
|---|---|---|
| 2,131,592 | Lange et al. | Sept. 27, 1938 |
| 2,842,607 | Germershausen et al. | July 8, 1958 |
| 2,857,447 | Lindstrom | Oct. 21, 1958 |
| 2,934,580 | Neumann | Apr. 26, 1960 |
| 3,005,943 | Jaffee | Oct. 24, 1961 |